(12) United States Patent
Lee et al.

(10) Patent No.: US 11,505,333 B2
(45) Date of Patent: Nov. 22, 2022

(54) PHOTOGRAPHIC DEVICE AND UNMANNED VEHICLE

(71) Applicant: Coretronic Intelligent Robotics Corporation, Hsin-Chu (TW)

(72) Inventors: Yu-Wei Lee, Hsin-Chu (TW); Ying-Chieh Chen, Hsin-Chu (TW); Chi-Tong Hsieh, Hsin-Chu (TW); I-Ta Yang, Hsin-Chu (TW)

(73) Assignee: Coretronic Intelligent Robotics Corporation, Hsin-Chu (TW)

( * ) Notice: Subject to any disclaimer, the term of this patent is extended or adjusted under 35 U.S.C. 154(b) by 0 days.

(21) Appl. No.: 17/393,397

(22) Filed: Aug. 3, 2021

(65) Prior Publication Data

US 2022/0055768 A1 Feb. 24, 2022

(30) Foreign Application Priority Data

Aug. 19, 2020 (TW) .................................. 109128214

(51) Int. Cl.
  *B64D 47/08* (2006.01)
  *G03B 17/56* (2021.01)
  *G03B 15/00* (2021.01)
  *B64C 39/02* (2006.01)
  *G03B 9/42* (2021.01)

(52) U.S. Cl.
  CPC ............ *B64D 47/08* (2013.01); *B64C 39/024* (2013.01); *G03B 9/42* (2013.01); *G03B 15/006* (2013.01); *G03B 17/561* (2013.01); *B64C 2201/127* (2013.01)

(58) Field of Classification Search
  CPC .... G03B 17/561; G03B 15/006; B64D 47/08; B64C 2201/127
  See application file for complete search history.

(56) References Cited

U.S. PATENT DOCUMENTS

2018/0128338 A1\* 5/2018 Tian ........................ F16F 3/093

FOREIGN PATENT DOCUMENTS

| CN | 205872502 U | \* | 1/2017 | ........... B64C 39/024 |
|---|---|---|---|---|
| CN | 206813334 | | 12/2017 | |
| CN | 108238273 A | \* | 7/2018 | ........... B64C 39/024 |
| CN | 208364668 | | 1/2019 | |
| CN | 110654557 | | 1/2020 | |

(Continued)

*Primary Examiner* — Christopher E Mahoney
(74) *Attorney, Agent, or Firm* — JCIPRNET

(57) ABSTRACT

A photographic device is configured to be assembled on a body of an unmanned vehicle. The photographic device includes a tripod head module, a camera module, a shock-absorbing module, and a detachable supporting plate. The tripod head module includes a first motor disposed along a first axis, a second motor disposed along a second axis, a third motor disposed along a third axis, and a connecting arm. The camera module is pivotally connected to the tripod head module via the connecting arm. The shock-absorbing module includes a frame and a plurality of shock-absorbing balls. The third motor and the shock-absorbing balls are assembled on the frame, and the shock-absorbing balls surround the third motor. The detachable supporting plate is disposed between the frame of the shock-absorbing module and the camera module, and there is a buffer distance between the frame and the detachable supporting plate.

20 Claims, 12 Drawing Sheets

(56) References Cited

FOREIGN PATENT DOCUMENTS

| | | | | |
|---|---|---|---|---|
| CN | 106471337 B | * | 12/2020 | ............... A45F 5/10 |
| KR | 102110970 B1 | * | 5/2020 | ............. B64C 39/02 |
| KR | 102203450 B1 | * | 1/2021 | ............. B64C 27/08 |
| TW | 201527864 | | 7/2015 | |
| WO | WO-2018201718 A1 | * | 11/2018 | ........... B64C 39/024 |

* cited by examiner

PHOTOGRAPHIC DEVICE AND UNMANNED VEHICLE

CROSS-REFERENCE TO RELATED APPLICATION

This application claims the priority benefit of Taiwan application serial no. 109128214, filed on Aug. 19, 2020. The entirety of the above-mentioned patent application is hereby incorporated by reference herein and made a part of this specification.

BACKGROUND

Technical Field

The disclosure relates to an electronic device and a vehicle, and more particularly to a photographic device and an unmanned vehicle adopting the photographic device.

Description of Related Art

Generally speaking, camera module is a relatively important electronic module on an unmanned vehicle. The camera module can provide the unmanned vehicle a vision function when performing tasks such as area patrolling, personnel and object recognition, or flight vision. After the unmanned vehicle completes a set task, it will automatically return to home; and after the automatic charging is completed, the next task will be executed. Taking drones as an example, in order to solve the problem of skewed images caused by the vibration of the camera module during the flight of the drone, a self-stable tripod head with a shock-absorbing module may be configured to alleviate the vibration of the body of the drone. However, as the drone suffers really massive impact while landing, the motor of the tripod head module disposed along the yaw axis is damaged. In addition, the battery of the drone needs to be charged either regularly or irregularly, and the motor of the tripod head module lacks effective protection when the drone is being charged, thereby affecting the autonomous flight of the drone.

The information disclosed in this BACKGROUND section is only for enhancement of understanding of the BACKGROUND section of the described technology and therefore it may contain information that does not form the prior art that is already known to a person of ordinary skill in the art. Further, the information disclosed in the BACKGROUND section does not mean that one or more problems to be resolved by one or more embodiments of the disclosure was acknowledged by a person of ordinary skill in the art.

SUMMARY

The disclosure provides a photographic device which is configured to be assembled on the body of an unmanned vehicle and has good structural reliability.

The disclosure also provides an unmanned vehicle including the photographic device and capable of protecting the motor of the tripod head module when impacted or being charged.

Other objectives and advantages of the disclosure can be further understood from the technical features disclosed in the disclosure.

In order to achieve one, part, or all of the above objectives or other objectives, an embodiment of the disclosure provides a photographic device assembled on the body of an unmanned vehicle. The photographic device includes a tripod head module, a camera module, a shock-absorbing module, and a detachable supporting plate. The tripod head module includes a first motor disposed along a first axis, a second motor disposed along a second axis, a third motor disposed along a third axis, and a connecting arm. The camera module is pivotally connected to the tripod head module via the connecting arm. The shock-absorbing module includes a frame and a plurality of shock-absorbing balls. The third motor and the shock-absorbing balls are assembled on the frame, and the shock-absorbing balls surround the third motor. The detachable supporting plate is disposed between the frame of the shock-absorbing module and the camera module, and there is a buffer distance between the frame and the detachable supporting plate.

In an embodiment of the disclosure, a lower surface of the frame and an upper surface of the detachable supporting plate are opposite to each other. The buffer distance is a vertical distance between the lower surface and the upper surface, and the buffer distance is at least 4.5 mm.

In an embodiment of the disclosure, the photographic device further includes a sliding slot assembly assembled on the frame of the shock-absorbing module or the body of the unmanned vehicle.

In an embodiment of the disclosure, the detachable supporting plate is slidably disposed on the sliding slot assembly, and the shape of the detachable supporting plate is approximately U-shaped.

In an embodiment of the disclosure, the frame includes at least one abutting portion. The buffer distance between the detachable supporting plate and the at least one abutting portion of the frame is maintained when the shock-absorbing balls are in an original state. The abutting portion of the frame abuts against the detachable supporting plate when the shock-absorbing balls are in a compressed state.

In an embodiment of the disclosure, the photographic device further includes a detachable protecting frame slidably assembled to the sliding slot assembly to restrict the movements of the tripod head module along the first axis, the second axis, and the third axis.

In an embodiment of the disclosure, the detachable supporting plate is assembled on the body of the unmanned vehicle.

In an embodiment of the disclosure, the shape of the detachable supporting plate is L-shaped.

In an embodiment of the disclosure, the third motor includes a driving end, and the driving end has a lower surface. The buffer distance between the detachable supporting plate and the frame is maintained when the shock-absorbing balls are in an original state. The driving end of the third motor abuts against the detachable supporting plate when the shock-absorbing balls are in a compressed state.

In an embodiment of the disclosure, the first axis is a pitch axis, the second axis is a roll axis, and the third axis is a yaw axis.

In order to achieve one, part, or all of the above objectives or other objectives, an embodiment of the disclosure provides an unmanned vehicle including a body and a photographic device. The photographic device is assembled on the body, and the photographic device includes a tripod head module, a camera module, a shock-absorbing module, and a detachable supporting plate. The tripod head module includes a first motor disposed along a first axis, a second motor disposed along a second axis, a third motor disposed along a third axis, and a connecting arm. The camera module is pivotally connected to the tripod head module via the connecting arm. The shock-absorbing module includes a frame and a plurality of shock-absorbing balls. The third motor and the shock-absorbing balls are assembled on the frame, and the shock-absorbing balls surround the third motor. The detachable supporting plate is disposed between the frame of the shock-absorbing module and the camera module, and there is a buffer distance between the frame and the detachable supporting plate.

In an embodiment of the disclosure, a lower surface of the frame and an upper surface of the detachable supporting plate are opposite to each other. The buffer distance is a vertical distance between the lower surface and the upper surface, and the buffer distance is at least 4.5 mm.

In an embodiment of the disclosure, the photographic device further includes a sliding slot assembly assembled on the frame of the shock-absorbing module or the body of the unmanned vehicle.

In an embodiment of the disclosure, the detachable supporting plate is slidably disposed on the sliding slot assembly, and the shape of the detachable supporting plate is approximately U-shaped.

In an embodiment of the disclosure, the frame includes at least one abutting portion. The buffer distance between the detachable supporting plate and the at least one abutting portion of the frame is maintained when the body is not impacted and the shock-absorbing balls are in an original state. The at least one abutting portion of the frame abuts against the detachable supporting plate when the body is impacted and the shock-absorbing balls are in a compressed state.

In an embodiment of the disclosure, the photographic device further includes a detachable protecting frame slidably assembled to the sliding slot assembly to restrict the movements of the tripod head module along the first axis, the second axis, and the third axis.

In an embodiment of the disclosure, the detachable supporting plate is assembled on the body of the unmanned vehicle.

In an embodiment of the disclosure, the shape of the detachable supporting plate is L-shaped.

In an embodiment of the disclosure, the third motor includes a driving end, and the driving end has a lower surface. The buffer distance between the detachable supporting plate and the lower surface is maintained when the body is not impacted and the shock-absorbing balls are in an original state. The driving end of the third motor abuts against the detachable supporting plate when the body is impacted and the shock-absorbing balls are in a compressed state.

In an embodiment of the disclosure, the first axis is a pitch axis, the second axis is a roll axis, and the third axis is a yaw axis.

Base on the above, the embodiments of the disclosure have at least one of the following advantages or effects. In the design of the photographic device of the disclosure, the detachable supporting plate is disposed between the frame of the shock-absorbing module and the camera module, and there is a buffer distance between the frame and the detachable supporting plate. Thereby, when the unmanned vehicle is impacted or is being charged, the detachable supporting plate is capable of protecting the third motor of the tripod head module disposed along the third axis in an effective manner, so that the photographic device can have good structure reliability. In addition, the unmanned vehicle adopting the photographic device can be charged while it is performing a task, which thereby contributes to the attainment of the autonomous operation.

In order to make the aforementioned features and advantages of the disclosure comprehensible, embodiments accompanied with drawings are described in detail below.

DESCRIPTION OF THE EMBODIMENTS

The above and other technical contents, features and effects of the disclosure will be clear from the below detailed description of an embodiment of the disclosure with reference to accompanying drawings. The directional terms mentioned in the embodiments below, like "above", "below", "left", "right", "front", and "back", refer to the directions in the appended drawings. Therefore, the directional terms are used to illustrate rather than limit the disclosure.

Figure 1A:
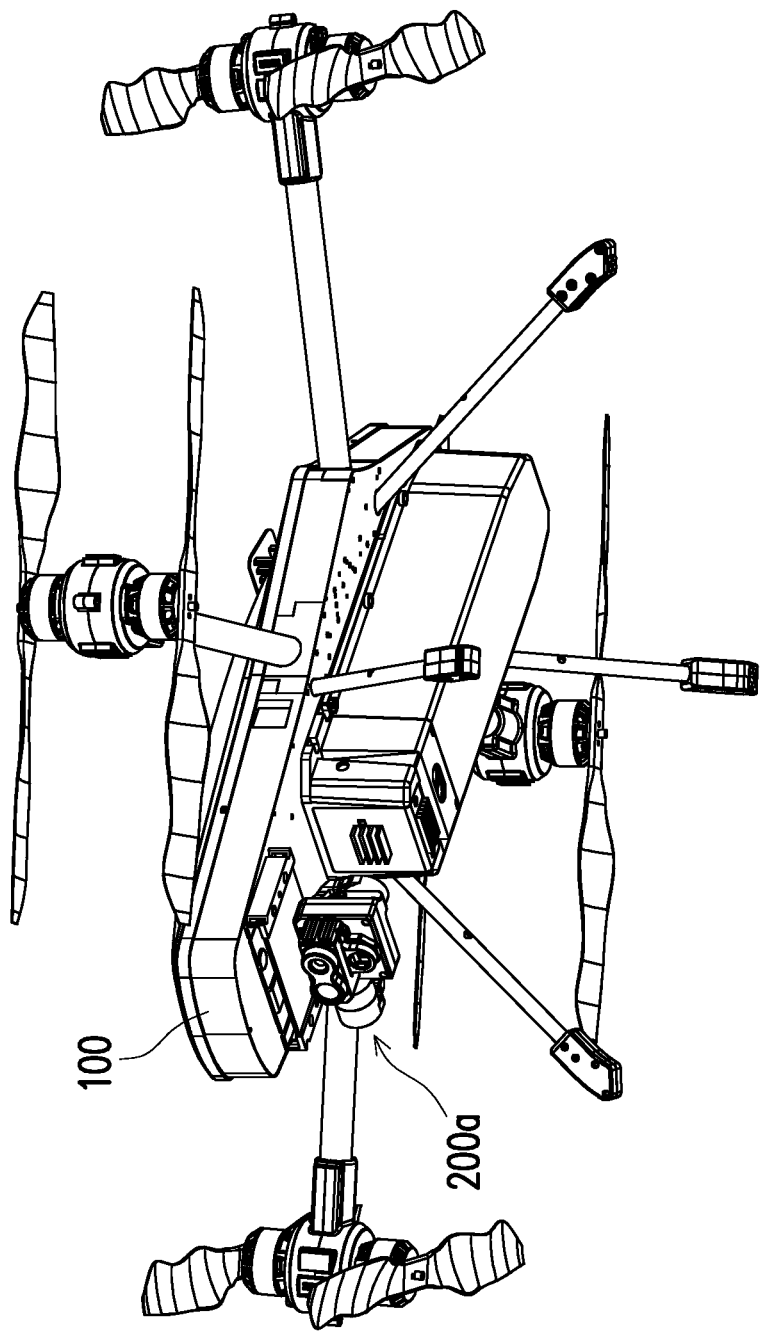
FIG. 1A is a three-dimensional schematic view of an unmanned vehicle according to an embodiment of the disclosure.
Figure 1B:
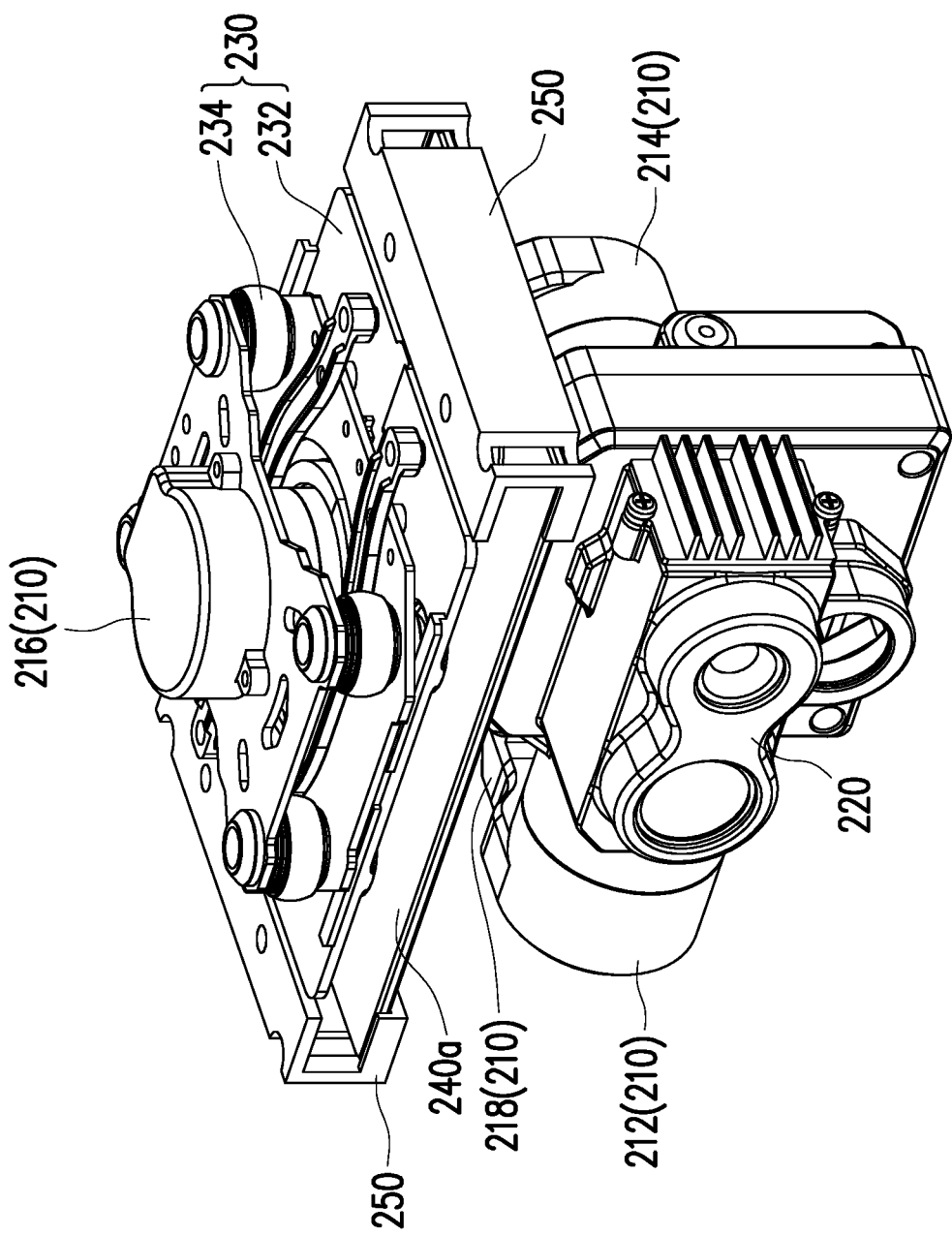
FIG. 1B is a schematic enlarged view of the photographic device of FIG. 1A.
Figure 1C:
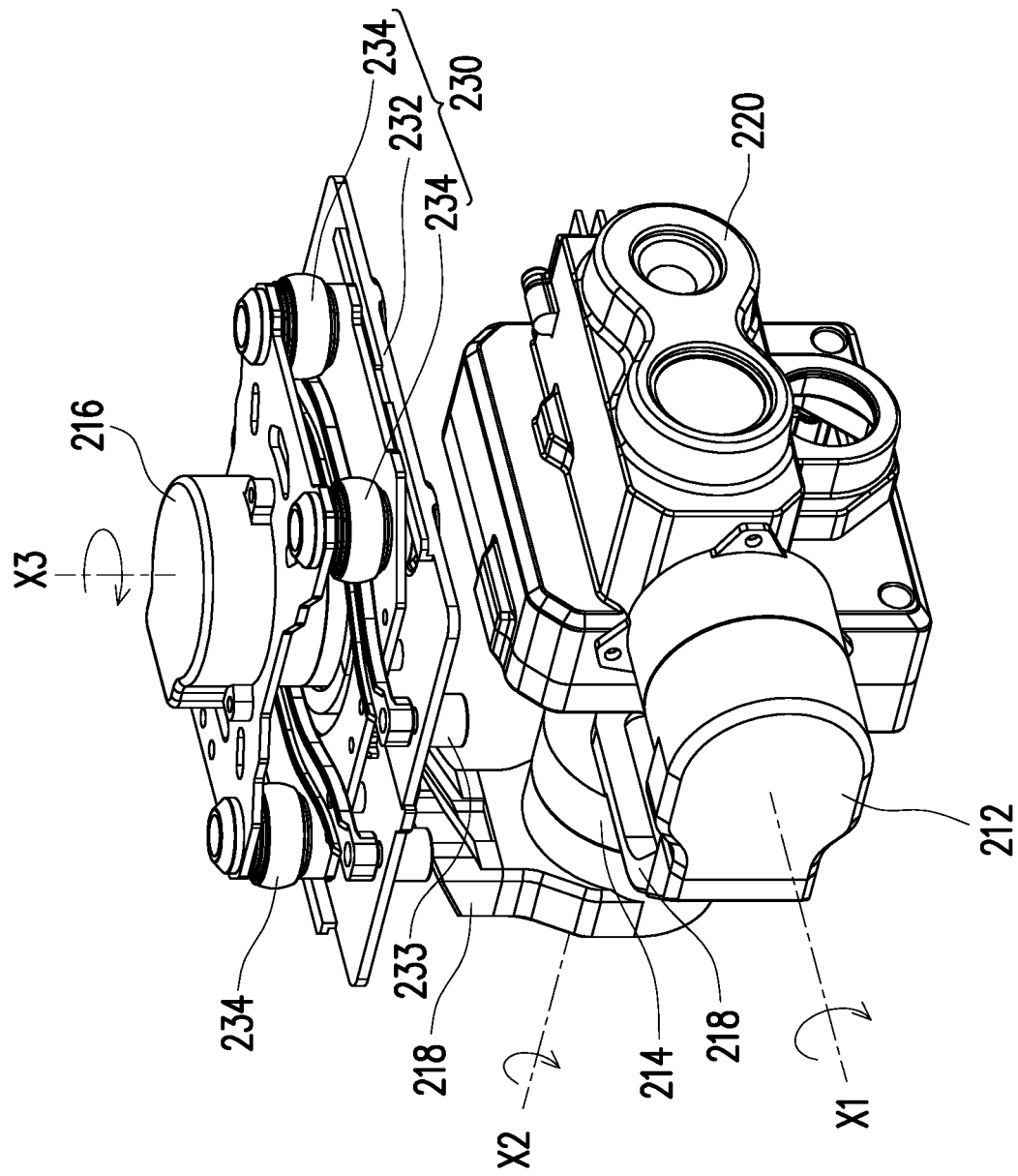
FIG. 1C is a schematic view of the photographic device of FIG. 1B in another viewing angle.
Figure 1D:
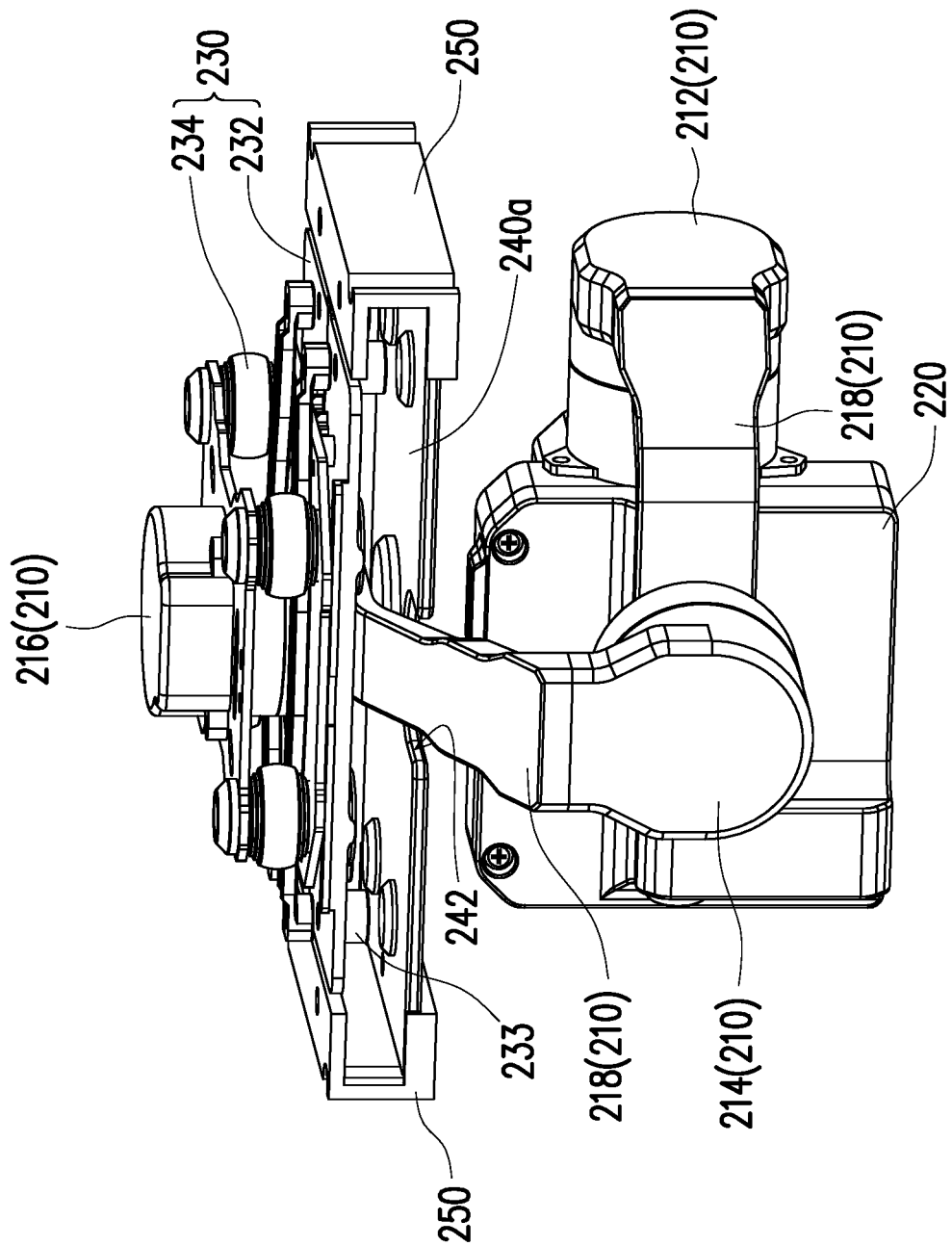
FIG. 1D is a schematic view of the photographic device of FIG. 1B in still another viewing angle.
Figure 1E:
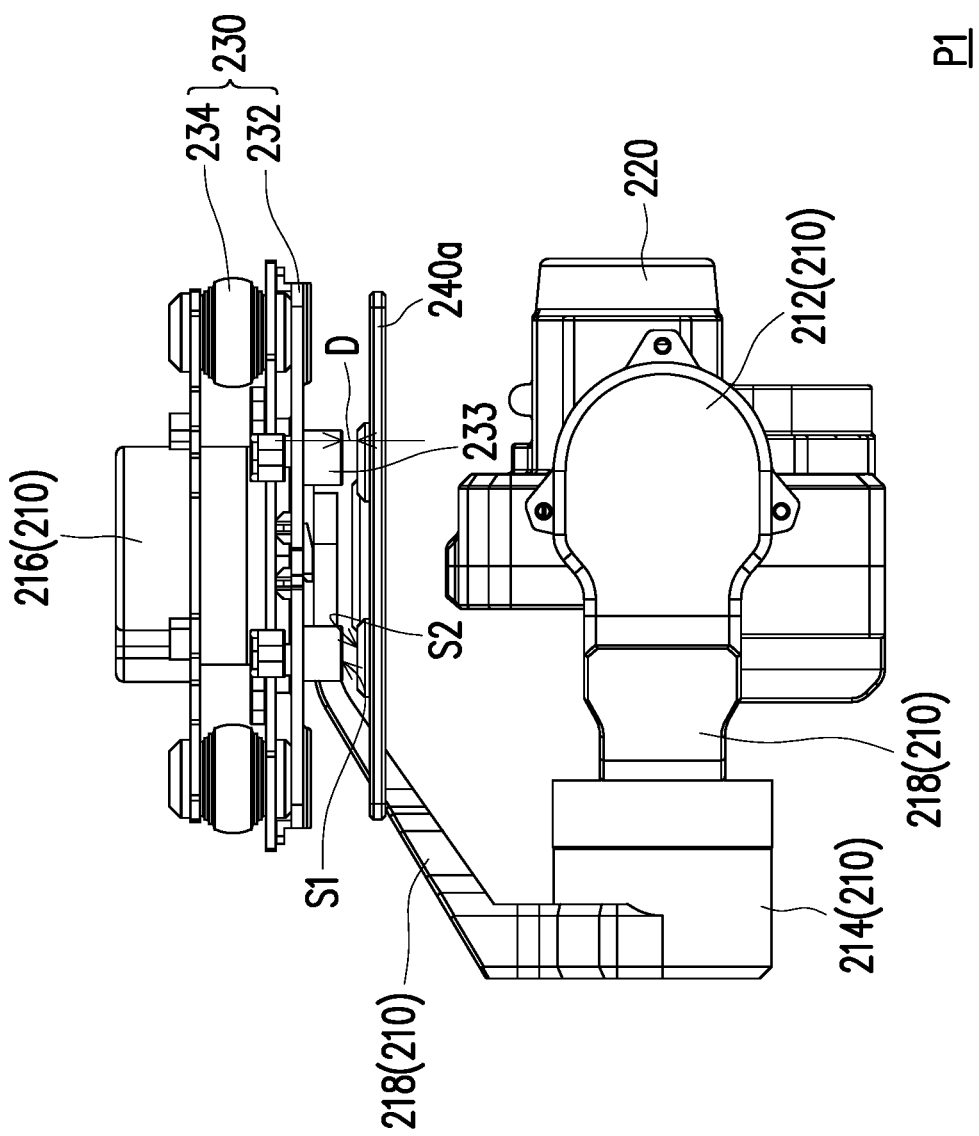
FIG. 1E is a schematic side view of the shock-absorbing balls of the shock-absorbing module of the photographic device of FIG. 1B in an original state.
Figure 1F:
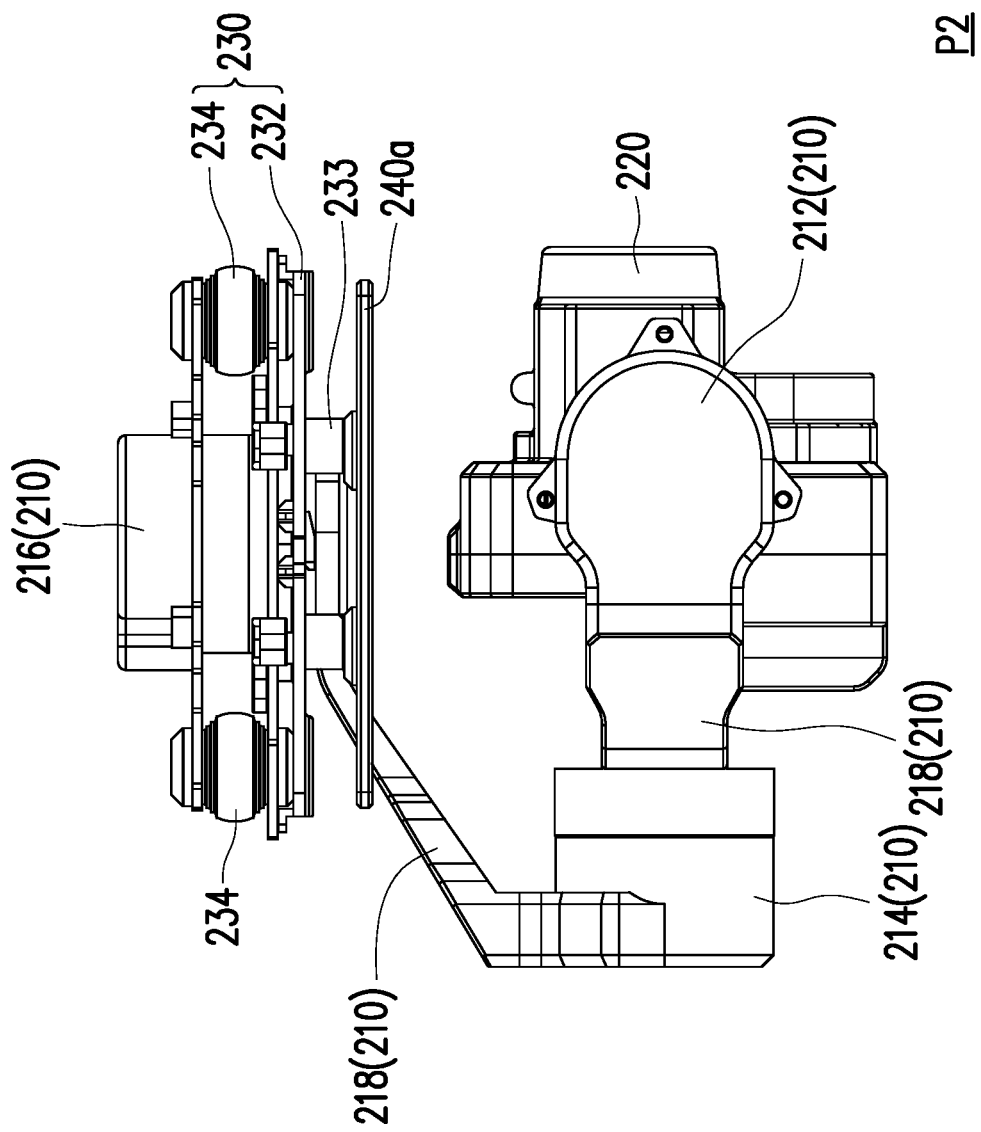
FIG. 1F is a schematic side view of the shock-absorbing balls of the shock-absorbing module of the photographic device of FIG. 1B in a compressed state.
Figure 1G:
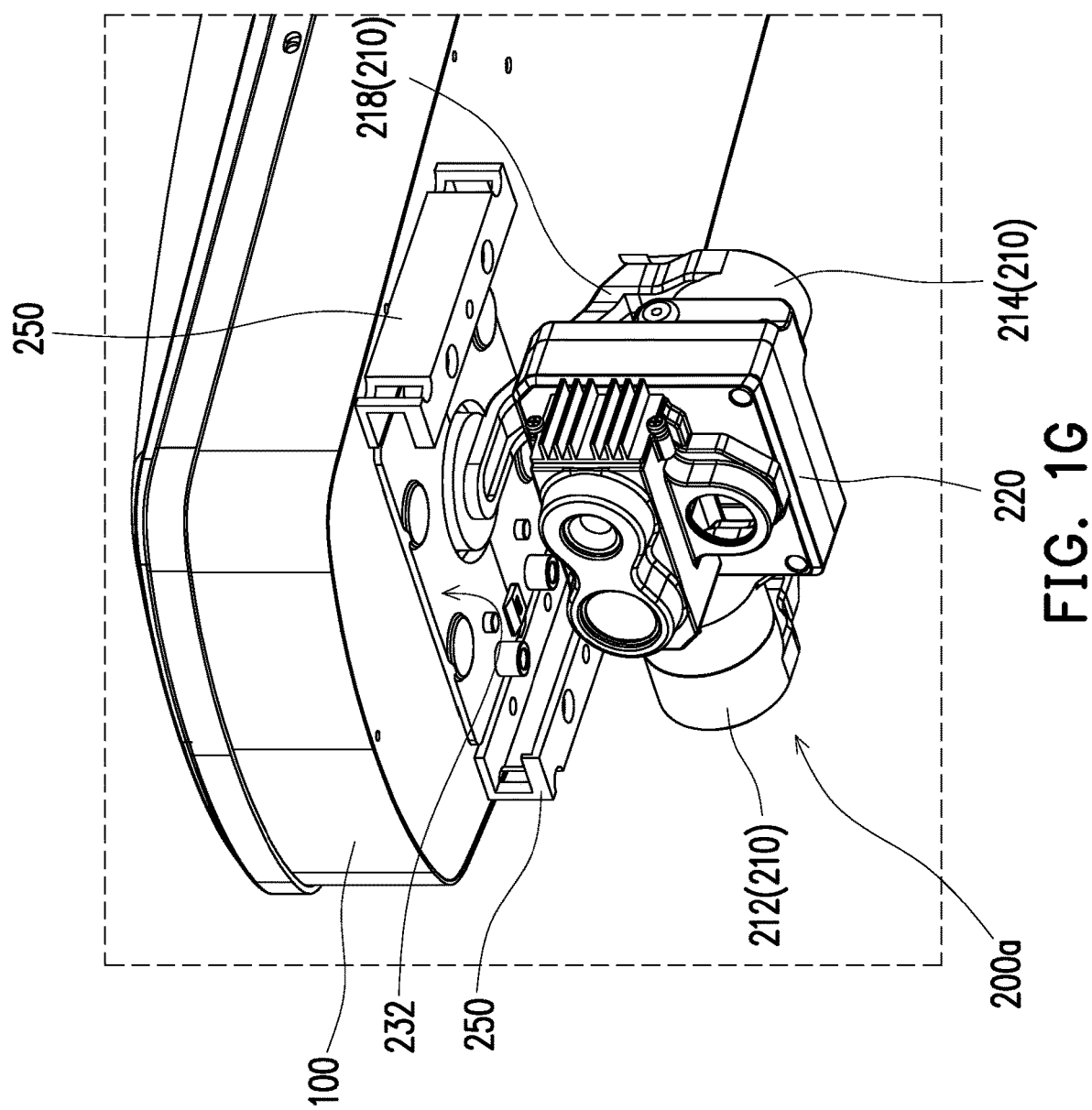
FIG. 1G is a schematic enlarged view of part of the unmanned vehicle of FIG. 1A when it is not charged.

FIG. 1A is a three-dimensional schematic view of an unmanned vehicle according to an embodiment of the disclosure. FIG. 1B is a schematic enlarged view of the photographic device of FIG. 1A. FIG. 1C is a schematic view of the photographic device of FIG. 1B in another viewing angle. FIG. 1D is a schematic view of the photographic device of FIG. 1B in still another viewing angle. FIG. 1E is a schematic side view of the shock-absorbing balls of the shock-absorbing module of the photographic device of FIG. 1B in an original state. FIG. 1F is a schematic side view of the shock-absorbing balls of the shock-absorbing module of the photographic device of FIG. 1B in a compressed state. FIG. 1G is a schematic enlarged view of part of the unmanned vehicle of FIG. 1A when it is not charged. For convenience of description, a sliding slot assembly and a detachable supporting plate are omitted and not illustrated in FIG. 1C, and the sliding slot assembly is omitted and not illustrated in FIG. 1E and FIG. 1F.

Referring to FIG. 1A first, in the embodiment, an unmanned vehicle 10a includes a body 100 and a photographic device 200a. The photographic device 200a is assembled on the body 100 and located under the body 100. As shown in FIG. 1A, the unmanned vehicle 10a includes, for example, a drone, but the disclosure is not limited thereto.

Referring to FIG. 1B, FIG. 1C, and FIG. 1D, the photographic device 200a in the embodiment includes a tripod head module 210, a camera module 220, a shock-absorbing module 230, and a detachable supporting plate 240a. In detail, the tripod head module 210 includes a first motor 212 disposed along a first axis X1, a second motor 214 disposed along a second axis X2, a third motor 216 disposed along a third axis X3, and a connecting arm 218. The second motor 214 is located between the first motor 212 and the third motor 216, and the second motor 214 is connected to the first motor 212 and the third motor 216 via the connecting arm 218. The camera module 220 is pivotally connected to the tripod head module 210 via the connecting arm 218. Specifically, the tripod head module 210 may include, for example, a self-stable tripod head, and the camera module 220 may be connected to the first motor 212 disposed along the first axis X1. Note that the first axis X1 is, for example, a pitch axis; the second axis X2 is, for example, a roll axis; and the third axis X3 is, for example, a yaw axis.

Referring to FIG. 1D and FIG. 1E, the shock-absorbing module 230 in the embodiment includes a frame 232 and a plurality of shock-absorbing balls 234. The third motor 216 and the shock-absorbing balls 234 are assembled on the frame 232. As shown in FIG. 1B, the plurality of shock-absorbing balls 234 may be disposed around the third motor 216. The detachable supporting plate 240a is disposed in a detachable manner between the frame 232 of the shock-absorbing module 230 and the camera module 220. As shown in FIG. 1E, there is a buffer distance D between the frame 232 and the detachable supporting plate 240a, and a lower surface S1 of the frame 232 and an upper surface S2 of the detachable supporting plate 240a are opposite to each other. The buffer distance D is a vertical distance between the lower surface S1 and the upper surface S2, and the buffer distance D is at least 4.5 mm. In addition, as shown in FIG. 1D, the detachable supporting plate 240a in the embodiment substantially may include a notch 242 to give way to the connecting arm 218. Therefore, the shape of the detachable supporting plate 240a in the embodiment may be, for example, approximately U-shaped.

Furthermore, referring to FIG. 1B and FIG. 1D again, the photographic device 200a in the embodiment further includes a sliding slot assembly 250, and the sliding slot assembly 250 is assembled on the body 100. The detachable supporting plate 240a is slidably disposed on the sliding slot assembly 250. In another embodiment not shown, the sliding slot assembly 250 may also be assembled on the frame 232 of the shock-absorbing module 230, which still belongs to the scope of the disclosure. In other words, the sliding slot assembly 250 in the embodiment is assembled on the frame 232 of the shock-absorbing module 230 or on the body 100 of the unmanned vehicle 10a according to requirements. The detachable supporting plate 240a is disposed between the frame 232 of the shock-absorbing module 230 and the camera module 220 in a sliding or a non-sliding manner, so as to be detachably disposed on the body 100 of the unmanned vehicle 10a.

Referring to FIG. 1A, FIG. 1E, and FIG. 1F, the frame 232 in the embodiment includes at least one abutting portion 233 (schematically, a plurality of them are shown). In an embodiment, the abutting portion 233 and the frame 232 are integrally formed. As shown in FIG. 1E, when the body 100 (shown in FIG. 1A) is not impacted and the shock-absorbing balls 234 are in an original state P1, the buffer distance D between the detachable supporting plate 240a and the frame 232 is maintained. As shown in FIG. 1F, when the body 100 is impacted (e.g., falling) and the shock-absorbing balls 234 are in a compressed state P2, the abutting portion 233 of the frame 232 abuts against the detachable supporting plate 240a. Furthermore, the shock-absorbing balls 234 of the shock-absorbing module 230 are deformed, so that the abutting portion 233 of the frame 232 is in contact with the detachable supporting plate 240a, and the detachable supporting plate 240a provides an upward support force. In the above embodiment, the buffer distance D refers to the vertical distance between the lower surface S1 of the abutting portion 233 and the upper surface S2 of the detachable supporting plate 240a, but the disclosure is not limited thereto. In other embodiments, the frame 232 may not include the abutting portion. Under the circumstance, the buffer distance D may be the vertical distance between the lower surface of the frame 232 and the upper surface S2 of the detachable supporting plate 240a.

According to an experiment, in the embodiment, the length/height of the shock-absorbing ball 234 in an uncompressed state is 12 mm. When the photographic device 200a is assembled on the body 100, the shock-absorbing balls are deformed due to the weight of the body 100, and the length/height is 10.5 mm. The shock-absorbing ball may be further compressed, and the length/height is 4 mm when the shock-absorbing ball is in a compression limit state. In other words, compared to the shock-absorbing ball 234 in an uncompressed state, the shock-absorbing compression caused by the weight of the body 100 is 1.5 mm, which is recorded as 1 G=1.5 mm. When the shock-absorbing ball is in the compression limit state, the compression limit is 8 mm, which is recorded as about 5.3 G=8/1.5. In general, a drone can withstand an acceleration of about 2 G in vertical movement, and can withstand an acceleration of less than 3 G in horizontal movement. Therefore, in the embodiment, the detachable supporting plate 240a is disposed in a manner in which the buffer distance D between the detachable supporting plate 240a and the frame 232 is about 4.5 mm, i.e., 3 G, to provide safe support. Under the circumstance, the camera module 220 may move within a range of 1.5 mm (3 G), and when the moving range exceeds 1.5 mm (3 G), the detachable supporting plate 240a is capable of providing protection in time. In other words, when the unmanned vehicle 10a is impacted, before the shock-absorbing ball 234 reaches the deformation limit, the detachable supporting plate 240a is capable of providing support to share the impact, thereby reducing the impact and damage loss of the third motor 216 of the tripod head module 210. In other embodiments, the buffer distance D does not exceed 8 mm, that is, does not exceed the compression limit when the shock-absorbing ball is in the compression limit state.

In addition, when the unmanned vehicle 10a (e.g., a drone) is being charged, the first motor 212, the second motor 214, and the third motor 216 of the tripod head module 210 may be in an excited state, and the tripod head module 210 may maintain a horizontal posture automatically. Therefore, the sliding slot assembly 250 ensures that the detachable supporting plate 240a is not in contact with the tripod head module 210, so as to prevent the first motor 212, the second motor 214, and the third motor 216 of the tripod head module 210 from being overheated and damaged, which is caused by the mechanical limit of the detachable supporting plate 240*a*. In addition, the configuration of the detachable supporting plate 240*a* in the embodiment still allows the tripod head module 210 to freely move along the first axis X1, the second axis X2, and the third axis X3 when the unmanned vehicle 10*a* is being charged. Furthermore, there is a moving range of at least 4.5 mm in the third axis X3 (i.e., the buffer distance D). When the unmanned vehicle 10*a* is subjected to an impact or vibration and moves a distance greater than the buffer distance D, the detachable supporting plate 240*a* is capable of providing protection in time.

In short, in the design of the photographic device 200*a* in the embodiment, the detachable supporting plate 240*a* is disposed between the frame 232 of the shock-absorbing module 230 and the camera module 220, and there is the buffer distance D between the frame 232 and the detachable supporting plate 240*a*. When the unmanned vehicle 10*a* is impacted (e.g., landing) or is being charged, with the configuration of the detachable supporting plate 240*a*, the third motor 216 of the tripod head module 210 is protected in an effective manner, and this can solve the problem of damage to the motor of the tripod head module disposed along the yaw axis when the conventional drone suffers massive impact and vibration. In other words, with the configuration of the detachable supporting plate 240*a* in the embodiment, the third motor 216 of the tripod head module 210 disposed along the third axis X3 is protected, so that the photographic device 200*a* in the embodiment can have good structure reliability. In addition, the above-mentioned design also meets the charging requirements of the unmanned vehicle 10*a* while it is moving, which thereby contributes to the attainment of the autonomous flight.

Note that, referring to FIG. 1G, when the unmanned vehicle 10*a* is flying or is not being charged, the detachable supporting plate 240*a* is selectively removed to expose the frame 232. In other words, when the unmanned vehicle 10*a* is flying, the detachable supporting plate 240*a* may be removed. In other embodiments, when the unmanned vehicle 10*a* is not charged, the detachable supporting plate 240*a* is disposed between the frame 232 and the camera module 220 to protect the third motor 216 of the tripod head module 210. In addition, in other embodiments, the tripod head module 210 may also include a sensor (not shown) for real-time detection of vibration and yaw, and accordingly to provide corresponding corrections to keep the image stable.

Note that the following embodiments use the reference numerals and a part of the contents of the above embodiments, and the same reference numerals are used to denote the same or similar elements, and the description of the same technical contents is omitted. For the description of the omitted part, reference may be made to the above embodiments, and details are not described in the following embodiments.

Figure 2A:
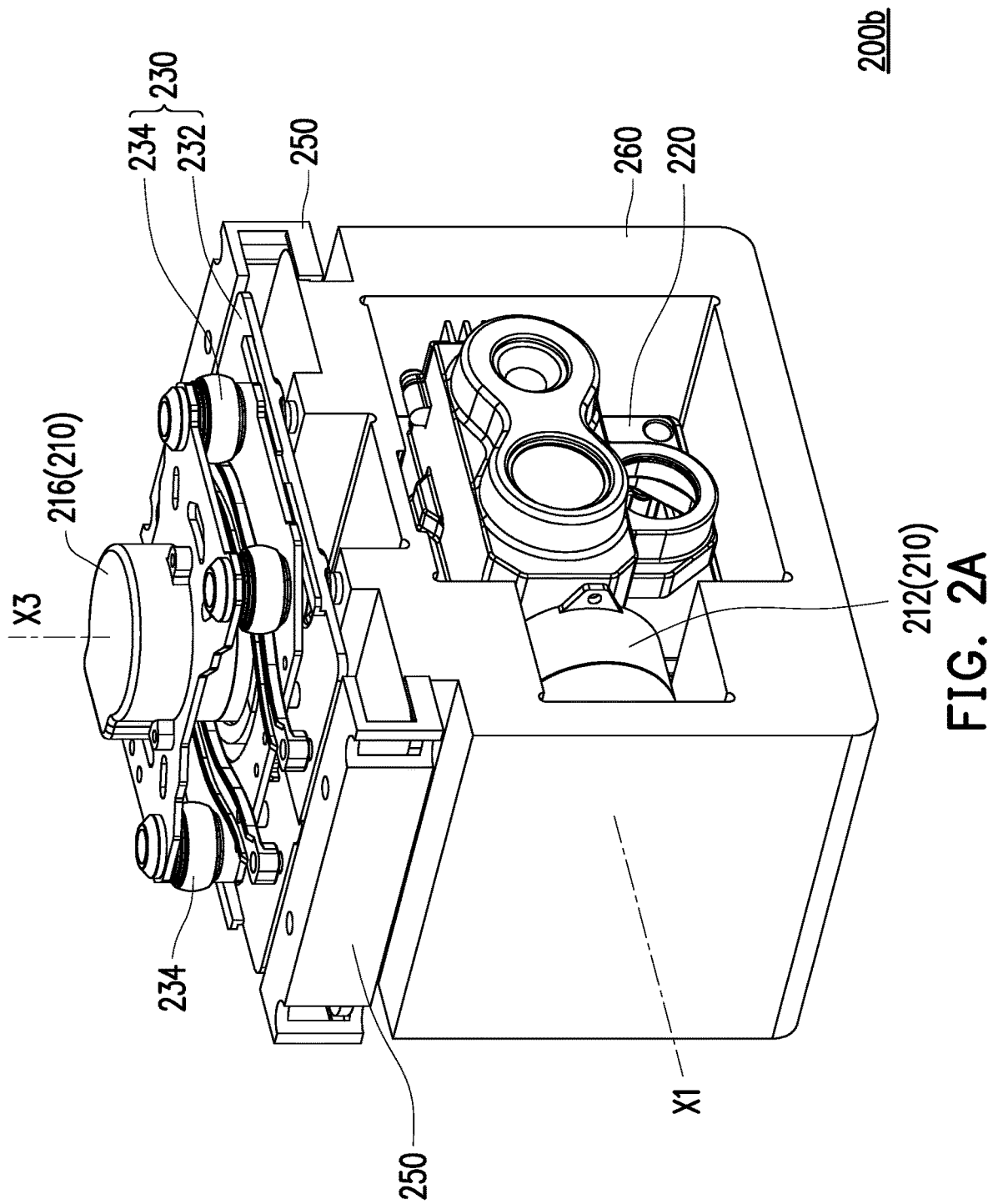
FIG. 2A is a three-dimensional schematic view of a photographic device according to an embodiment of the disclosure.
Figure 2B:
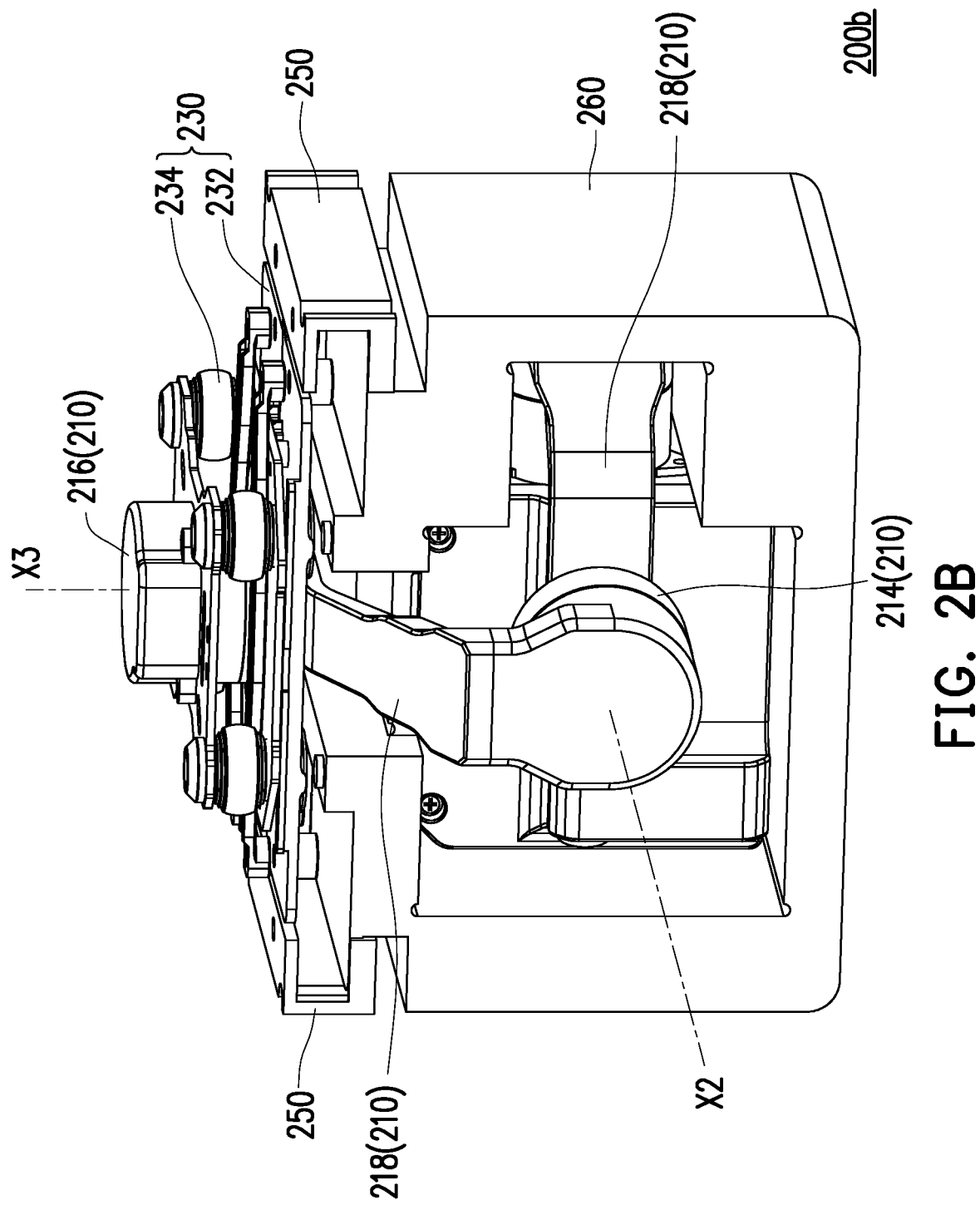
FIG. 2B is a three-dimensional schematic view of the photographic device of FIG. 2A in another viewing angle.

FIG. 2A is a three-dimensional schematic view of a photographic device according to an embodiment of the disclosure. FIG. 2B is a three-dimensional schematic view of the photographic device of FIG. 2A in another viewing angle. Referring to FIG. 1B, FIG. 1D, FIG. 2A, and FIG. 2B, the photographic device 200*b* in the embodiment is similar to the photographic device 200*a* of FIG. 1B, and the difference between the two is that the photographic device 200*b* in the embodiment also includes a detachable protecting frame 260. The detachable protecting frame 260 is slidably assembled to the sliding slot assembly 250 and is configured to restrict the movements of the tripod head module 210 along the first axis X1, the second axis X2, and the third axis X3.

Furthermore, when the unmanned vehicle 10*a* (referring to FIG. 1A) is not charged, the detachable protecting frame 260 is configured to restrict the movements of the tripod head module 210 along the first axis X1, the second axis X2, and the third axis X3; thereby enabling the tripod head module 210 to keep a specific posture. Here, the upper, lower, left, and right sides of the camera module 220 are all protected by the detachable protecting frame 260.

Figure 3A:
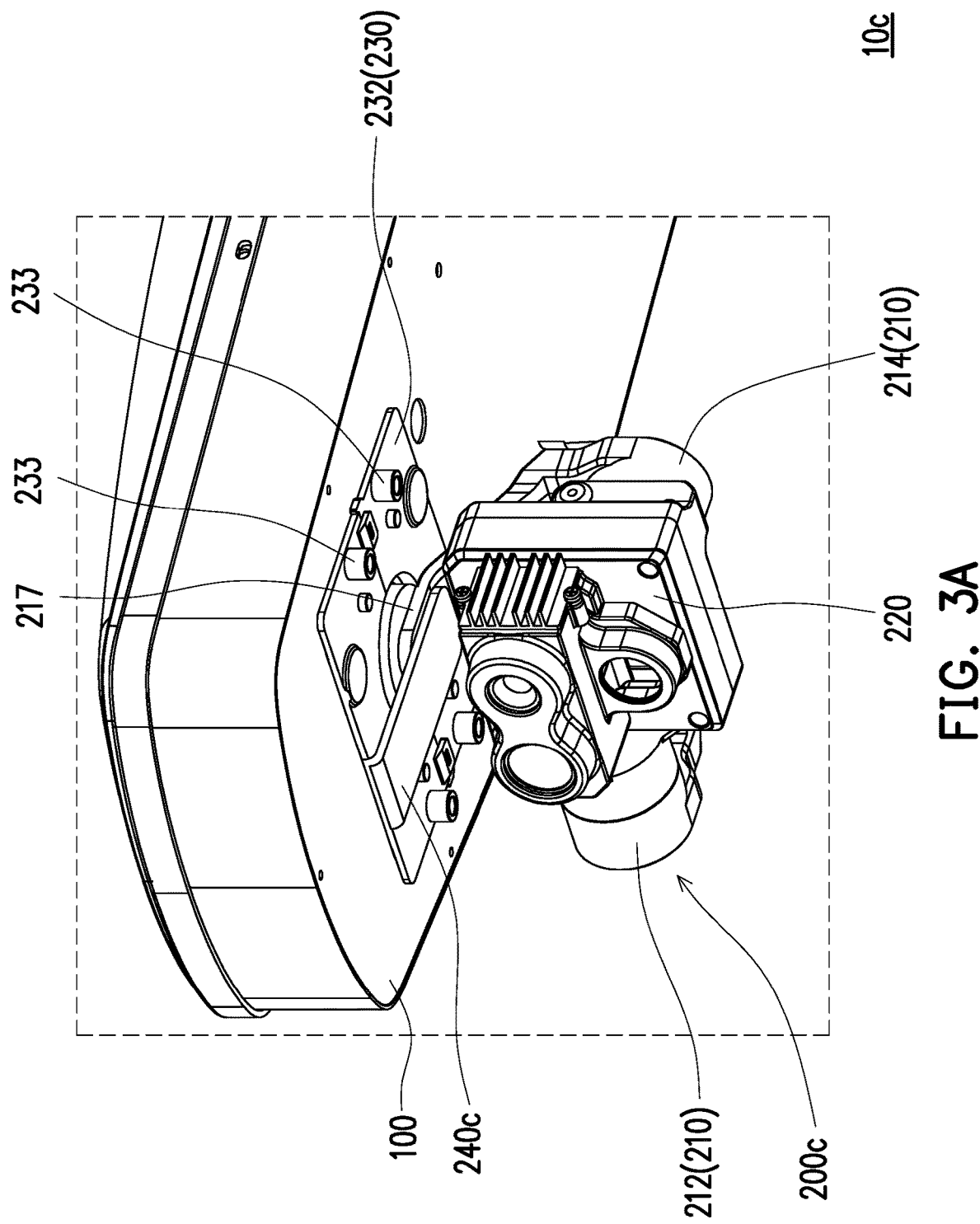
FIG. 3A is a three-dimensional schematic view of part of an unmanned vehicle according to another embodiment of the disclosure.
Figure 3B:
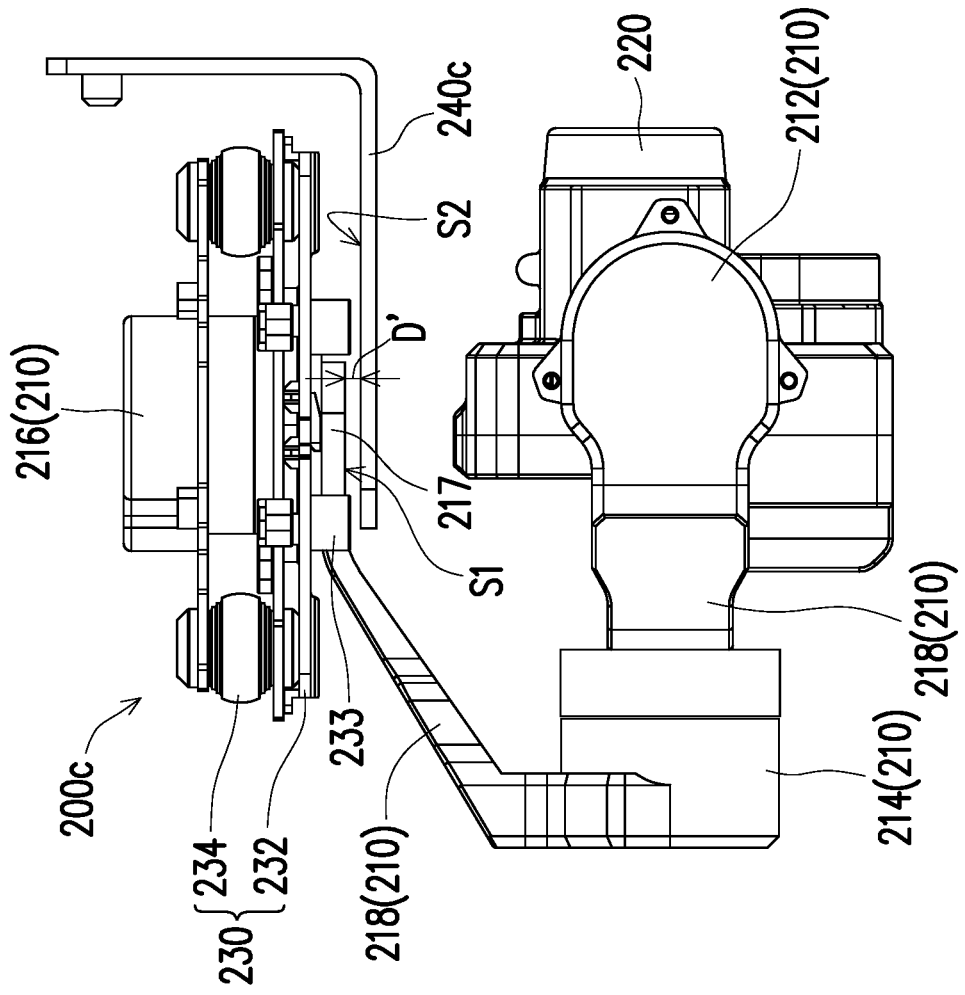
FIG. 3B is a schematic side view of the shock-absorbing balls of the shock-absorbing module of the photographic device of FIG. 3A in an original state.
Figure 3C:
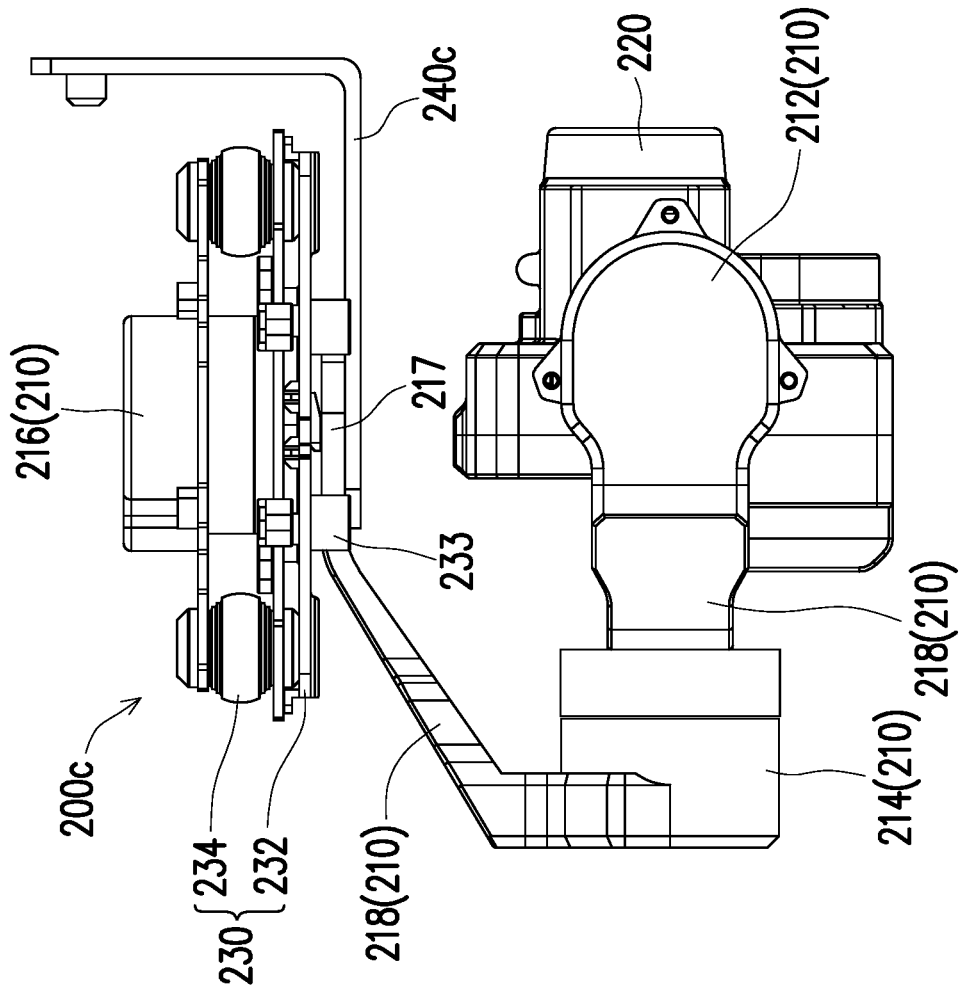
FIG. 3C is a schematic side view of the shock-absorbing balls of the shock-absorbing module of the photographic device of FIG. 3A in a compressed state.

FIG. 3A is a three-dimensional schematic view of part of an unmanned vehicle according to another embodiment of the disclosure. FIG. 3B is a schematic side view of the shock-absorbing balls of the shock-absorbing module of the photographic device of FIG. 3A in an original state. FIG. 3C is a schematic side view of the shock-absorbing balls of the shock-absorbing module of the photographic device of FIG. 3A in a compressed state. Referring to FIG. 1A, FIG. 1B, FIG. 3A, and FIG. 3B, the photographic device 200*c* in the embodiment is similar to the photographic device 200*a* of FIG. 1A, and the difference between the two is that the detachable supporting plate 240*c* of the photographic device 200*c* in the embodiment is assembled on the body 100 of an unmanned vehicle 10*c*, and the shape of the detachable supporting plate 240*c* is L-shaped.

In detail, referring to FIG. 3A, in the embodiment, the detachable supporting plate 240*c* is directly connected to the body 100 of the unmanned vehicle 10*c*, so that larger space is allowed for the tripod head module 210 to move freely, and thereby the sliding slot assembly 250 in FIG. 1C is omitted. Furthermore, with the design of the detachable supporting plate 240*c* in the embodiment and compared to the front viewing angle (e.g., 0 degrees) in the horizontal direction, the camera module 220 may have a maximum viewing angle of 120 degrees (e.g., recorded as +120 degrees) to the right and may have a maximum viewing angle of 120 degrees (e.g., recorded as −120 degrees) to the left. In other words, in the horizontal direction, the camera module 220 in the embodiment may be rotated at a maximum of ±120° and has a wide viewing angle.

In addition, referring to FIG. 3B and FIG. 3C, the third motor 216 in the embodiment includes a driving end 217, and the driving end 217 has the lower surface S1. As shown in FIG. 3B, when the body 100 is not impacted and the shock-absorbing ball 234 is in the original state P1, a buffer distance D′ between the detachable supporting plate 240*c* and the driving end 217 is maintained. As shown in FIG. 3C, when the body 100 is impacted (e.g., falling) and the shock-absorbing ball 234 is in the compressed state P2, the driving end 217 abuts against the detachable supporting plate 240*c*.

In short, in the design of the photographic device 200*c* in the embodiment, the detachable supporting plate 240*c* is disposed between the frame 232 of the shock-absorbing module 230 and the camera module 220. When the unmanned vehicle 10*c* is impacted (e.g., landing) or is being charged, with the configuration of the detachable supporting plate 240*c*, the third motor 216 of the tripod head module 210 is protected in an effective manner, and this can solve the problem of damage to the motor of the tripod head module disposed along the yaw axis when the conventional drone suffers massive impact and vibration. In other words, with the configuration of the detachable supporting plate 240*c* in the embodiment, the third motor 216 of the tripod head module 210 disposed along the third axis X3 is protected, so that the photographic device 200*c* in the embodiment can have good structure reliability. In addition, the above-mentioned design also meets the charging requirements of the unmanned vehicle 10c while it is moving, which thereby contributes to the attainment of the autonomous flight.

Based on the above, the embodiments of the disclosure have at least one of the following advantages or effects. The embodiments of the disclosure have at least one of the following advantages or effects. In the design of the photographic device of the disclosure, the detachable supporting plate is disposed between the shock-absorbing module and the camera module, and there is a buffer distance between the frame and the detachable supporting plate. Thereby, when the unmanned vehicle is impacted or is being charged, with the configuration of the detachable supporting plate, the third motor of the tripod head module disposed along the third axis is protected in an effective manner, so that the photographic device of the disclosure can have good structure reliability. In addition, the unmanned vehicle adopting the photographic device can be charged while it is performing a task, which thereby contributes to the attainment of the autonomous operation.

However, the above are only preferred embodiments of the disclosure and are not intended to limit the scope of the disclosure; that is, all simple and equivalent changes and modifications made according to the claims and the contents of the disclosure are still within the scope of the disclosure. In addition, any of the embodiments or the claims of the disclosure are not required to achieve all of the objects or advantages or features disclosed herein. In addition, the abstract and title are provided to assist in the search of patent documents and are not intended to limit the scope of the disclosure. In addition, the terms "first," "second" and the like mentioned in the specification or the claims are used only to name the elements or to distinguish different embodiments or scopes and are not intended to limit the upper or lower limit of the number of the elements.

What is claimed is:

1. A photographic device, configured to be assembled on a body of an unmanned vehicle, wherein the photographic device comprises:
    a tripod head module comprising a first motor disposed along a first axis, a second motor disposed along a second axis, a third motor disposed along a third axis, and a connecting arm;
    a camera module pivotally connected to the tripod head module via the connecting arm;
    a shock-absorbing module comprising a frame and a plurality of shock-absorbing balls, wherein the third motor and the plurality of shock-absorbing balls are assembled on the frame, and the plurality of shock-absorbing balls surround the third motor; and
    a detachable supporting plate disposed between the frame of the shock-absorbing module and the camera module, wherein there is a buffer distance between the frame and the detachable supporting plate.

2. The photographic device according to claim 1, wherein a lower surface of the frame and an upper surface of the detachable supporting plate are opposite to each other, the buffer distance is a vertical distance between the lower surface and the upper surface, and the buffer distance is at least 4.5 mm.

3. The photographic device according to claim 1, further comprising:
    a sliding slot assembly assembled on the frame of the shock-absorbing module or the body of the unmanned vehicle.

4. The photographic device according to claim 3, wherein the detachable supporting plate is slidably disposed on the sliding slot assembly, and a shape of the detachable supporting plate is approximately U-shaped.

5. The photographic device according to claim 3, further comprising:
    a detachable protecting frame slidably assembled to the sliding slot assembly to restrict movements of the tripod head module along the first axis, the second axis, and the third axis.

6. The photographic device according to claim 1, wherein the frame comprises at least one abutting portion; the buffer distance between the detachable supporting plate and the at least one abutting portion of the frame is maintained when the shock-absorbing balls are in an original state; and the at least one abutting portion of the frame abuts against the detachable supporting plate when the shock-absorbing balls are in a compressed state.

7. The photographic device according to claim 1, wherein the detachable supporting plate is assembled on the body of the unmanned vehicle.

8. The photographic device according to claim 1, wherein a shape of the detachable supporting plate is L-shaped.

9. The photographic device according to claim 8, wherein the third motor comprises a driving end; the driving end comprises a lower surface; the buffer distance between the detachable supporting plate and the lower surface is maintained when the shock-absorbing balls are in an original state; and the driving end of the third motor abuts against the detachable supporting plate when the shock-absorbing balls are in a compressed state.

10. The photographic device according to claim 1, wherein the first axis is a pitch axis, the second axis is a roll axis, and the third axis is a yaw axis.

11. An unmanned vehicle, comprising:
    a body; and
    a photographic device assembled on the body, wherein the photographic device comprises:
        a tripod head module comprising a first motor disposed along a first axis, a second motor disposed along a second axis, a third motor disposed along a third axis, and a connecting arm;
        a camera module pivotally connected to the tripod head module via the connecting arm;
        a shock-absorbing module comprising a frame and a plurality of shock-absorbing balls, wherein the third motor and the plurality of shock-absorbing balls are assembled on the frame, and the plurality of shock-absorbing balls surround the third motor; and
        a detachable supporting plate disposed between the frame of the shock-absorbing module and the camera module, wherein there is a buffer distance between the frame and the detachable supporting plate.

12. The unmanned vehicle according to claim 11, wherein a lower surface of the frame and an upper surface of the detachable supporting plate are opposite to each other, the buffer distance is a vertical distance between the lower surface and the upper surface, and the buffer distance is at least 4.5 mm.

13. The unmanned vehicle according to claim 11, wherein the photographic device further comprises:
    a sliding slot assembly assembled on the frame of the shock-absorbing module or the body.

14. The unmanned vehicle according to claim 13, wherein the detachable supporting plate is slidably disposed on the sliding slot assembly, and a shape of the detachable supporting plate is approximately U-shaped.

15. The unmanned vehicle according to claim 13, wherein the photographic device further comprises:

a detachable protecting frame slidably assembled to the sliding slot assembly to restrict movements of the tripod head module along the first axis, the second axis, and the third axis.

16. The unmanned vehicle according to claim 11, wherein the frame comprises at least one abutting portion; the buffer distance between the detachable supporting plate and the at least one abutting portion of the frame is maintained when the body is not impacted and the shock-absorbing balls are in an original state; and the at least one abutting portion of the frame abuts against the detachable supporting plate when the body is impacted and the shock-absorbing balls are in a compressed state.

17. The unmanned vehicle according to claim 11, wherein the detachable supporting plate is assembled on the body of the unmanned vehicle.

18. The unmanned vehicle according to claim 11, wherein a shape of the detachable supporting plate is L-shaped.

19. The unmanned vehicle according to claim 18, wherein the third motor comprises a driving end, the driving end comprises a lower surface, the buffer distance between the detachable supporting plate and the lower surface is maintained when the body is not impacted and the shock-absorbing balls are in an original state, and the driving end of the third motor abuts against the detachable supporting plate when the body is impacted and the shock-absorbing balls are in a compressed state.

20. The unmanned vehicle according to claim 11, wherein the first axis is a pitch axis, the second axis is a roll axis, and the third axis is a yaw axis.

\* \* \* \* \*